US012769832B2

(12) United States Patent
Jourdain et al.

(10) Patent No.: US 12,769,832 B2
(45) Date of Patent: Oct. 20, 2026

(54) WINDOWS REGISTRY INJECTION DETECTION

(71) Applicant: Dell Products L.P., Round Rock, TX (US)

(72) Inventors: Gerald M. Jourdain, Hudson, NH (US); Ravindra Lingampeth, Solapur (IN)

(73) Assignee: Dell Products L.P., Round Rock, TX (US)

( * ) Notice: Subject to any disclaimer, the term of this patent is extended or adjusted under 35 U.S.C. 154(b) by 101 days.

(21) Appl. No.: 18/766,422

(22) Filed: Jul. 8, 2024

(65) Prior Publication Data

US 2026/0010625 A1 Jan. 8, 2026

(51) Int. Cl.
*G06F 21/56* (2013.01)
*G06F 11/1446* (2026.01)

(52) U.S. Cl.
CPC ........ *G06F 21/565* (2013.01); *G06F 11/1458* (2013.01); *G06F 2201/80* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 9,317,686 | B1 * | 4/2016 | Ye | G06F 21/568 |
| 10,210,330 | B1 * | 2/2019 | Chen | G06F 11/1451 |
| 2012/0079596 | A1 * | 3/2012 | Thomas | H04L 63/1433 726/24 |
| 2017/0034189 | A1 * | 2/2017 | Powell | H04L 63/145 |
| 2019/0236274 | A1 * | 8/2019 | Brenner | G06F 21/6245 |

FOREIGN PATENT DOCUMENTS

| | | | | |
|---|---|---|---|---|
| KR | 102099553 B1 * | 4/2020 | | G07G 1/145 |
| WO | WO-2010030288 A1 * | 3/2010 | | G06F 11/1435 |

* cited by examiner

*Primary Examiner* — Eleni A Shiferaw
*Assistant Examiner* — Vivian D Ho
(74) *Attorney, Agent, or Firm* — Workman Nydegger

(57) ABSTRACT

One example method includes creating a backup of registry files of a system registry, extracting the registry files from the system registry, interrogating the extracted registry files to determine if malware is present in the registry files, comparing the backup with another backup of the registry files to determine if malware is present in the backup, and when malware is determined, by the interrogating and/or the comparing, to be indicated, performing a remedial action to attenuate an impact of the malware.

18 Claims, 6 Drawing Sheets

WINDOWS REGISTRY INJECTION DETECTION

COPYRIGHT AND MASK WORK NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNOLOGICAL FIELD OF THE DISCLOSURE

Embodiments disclosed herein generally relate to protection of data against malware and other threats. More particularly, at least some embodiments relate to systems, hardware, software, computer-readable media, and methods, for detection of, and protection against, malware and other threats in operating system registry files.

BACKGROUND

A registry such as the Microsoft® registry is a hierarchical database that can be used by malware to infect a machine, such as a Windows® OS (operating system) machine. Different infections include running programs on startup, scheduling items to run, decreasing access rights, and disabling components, among other things. Attacks such as these may have a direct negative impact on a user experience, and may lead to problems such as loss of personalized settings, application errors, or difficulties logging into a user account.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

DETAILED DESCRIPTION OF SOME EXAMPLE EMBODIMENTS

Figure 1:
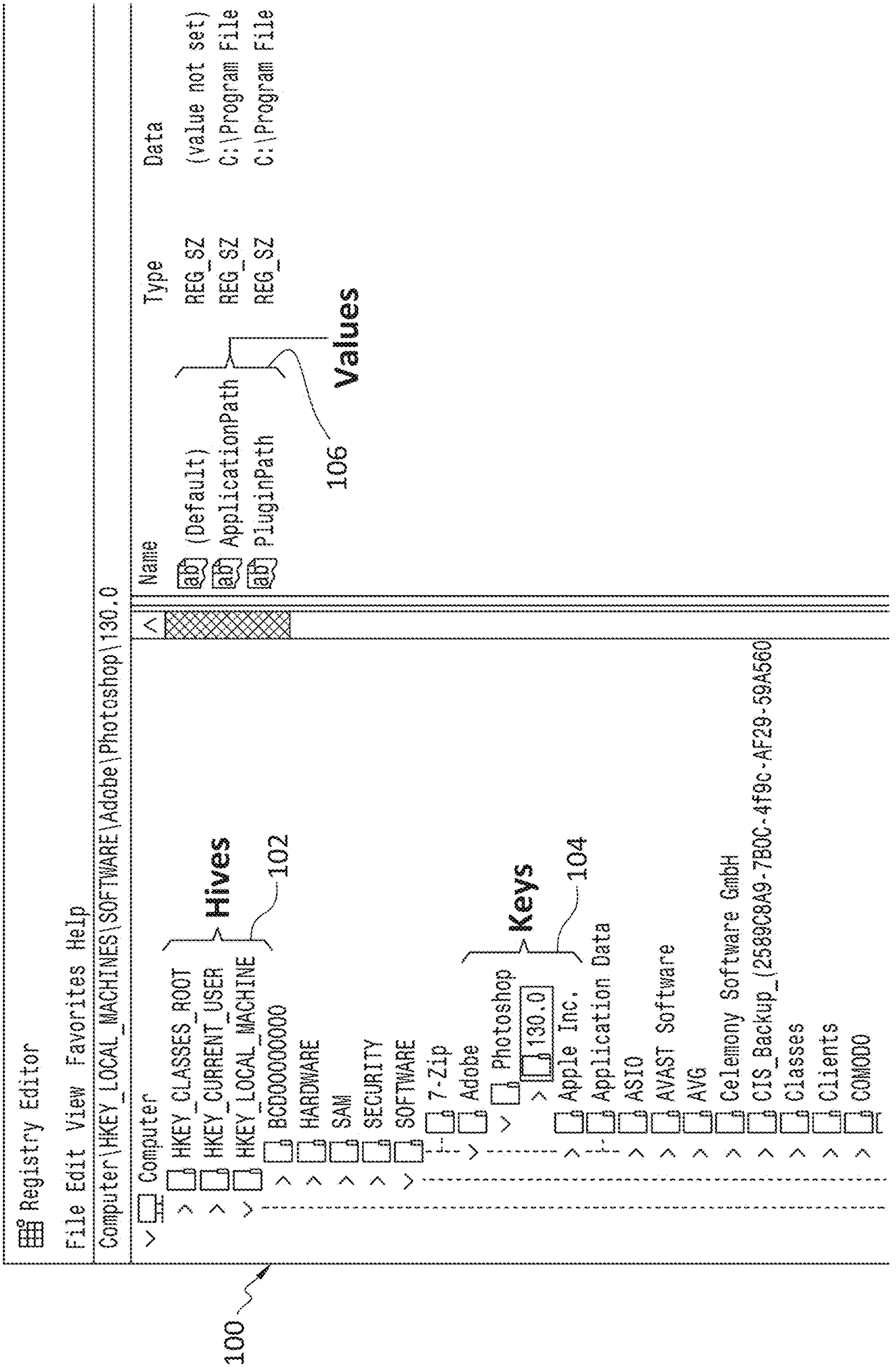
FIG. 1 discloses aspects of an example registry.

Embodiments disclosed herein generally relate to protection of data against malware and other threats. More particularly, at least some embodiments relate to systems, hardware, software, computer-readable media, and methods, for detection of, and protection against, malware and other threats in operating system registry files.

One example embodiment comprises a method for embedding malware detection in a data protection process for registry files. One such method may comprise operations including: performing a data protection process for registry files by creating a backup of the registry files; extracting the registry files from a system or device; interrogating the extracted registry files for malware; comparing the backup with an earlier backup to identify any changes in a listing of registry keys; and, taking a remedial action based on the interrogating and/or the comparing.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of the claims in any way. It should further be noted that nothing herein should be construed as constituting an essential or indispensable element of any embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that protection against, and/or detection of, malware such as ransomware may be implemented in a data protection process for registry files. An embodiment may provide protection against attackers at a registry level of a system or device. Various other advantages of one or more example embodiments will be apparent from this disclosure.

A. DISCUSSION OF ASPECTS OF ONE EMBODIMENT

A.1 Overview

One example embodiment comprises an approach for detecting malware injections during a data protection process for registry files. One embodiment may comprise two components, the first of which is to extract the registry during the data protection process and interrogate for well know infections. The second component involves comparing the extracted registry, that is, the registry files, to a previous backup of an extracted registry to produce a list of deleted items and newly added items. Thus, one embodiment may operate in connection with various control paths, including: (1) known infections such as firewall disable, and access rights elevation for the attacker; (2) modified items, such as registry keys, deleted items, such as registry keys for example; and (3) added items, such as registry keys for example.

Many ransomware strains use the Microsoft Windows® registry as a fundamental orchestration piece of their infection. In one embodiment, each of these control paths enable the identification of ransomware infections, and/or other attack vectors. Note that while reference is made herein to the Windows® OS registry, the scope of this disclosure, and any claims presented in connection with this application, is not limited to Windows® based approaches. Rather, embodiments may extend more generally to any particular OS (operating system) or registry.

A.2 Registry Overview

A registry, such as the Microsoft® registry for example, stores settings for the operating system (OS) and installed applications. The kernel, device drivers, services, security, and user interfaces all use the registry. As shown in the example of FIG. 1, a registry 100 is a database and comprised of a series of root keys referred to as hives 102. Within the hives 102 are one or more key-value pairs 104-106 in which, for example, a particular value 106 may be a subcomponent of a key 104, as shown in FIG. 1.

A.3 Registry Extraction

Typically, a registry is stored on the boot volume as a series of files. These files are stored using disk extents, which are contiguous sections on the volume. From time to time, the registry files may be backed up as part of a data protection process. Any number of backups of registry files may be taken, and at any time. During, or as part of, the data protection process, an embodiment may extract the registry files and save them for interrogation. Thus, in one or more embodiments, the data protection process may involve making one copy of the registry files, or two copies. In the first case, the copy is a backup which may then be interrogated. In the second case, one copy is backed up and stored, and the other copy is interrogated.

With reference to the illustrative, but non limiting, Windows® example, registry files are stored in \Windows\System32\config. These are files without extensions. For example, the "system" hive is \Windows\System32\config\System.

Some system registry files are stored in % SystemRoot %\System32\Config\ like these:

Sam: HKEY_LOCAL_MACHINE\SAM

Security: HKEY_LOCAL_MACHINE\SECURITY

Software: HKEY_LOCAL_MACHINE\SOFTWARE

System: HKEY_LOCAL_MACHINE\SYSTEM.

Default: HKEY_LOCAL_MACHINE\DEFAULT

Typically, registry files are hidden, read-only and require elevated privilege to access them when the operating system is running. An understanding of the file system structure is typically needed to perform extraction of these registry files.

A.4 User Registry

In addition to the registry hive noted earlier, there is another registry hive file in Windows®, which is a component of the Windows operating system user profiles. The path to this registry hive file is typically C:\Users\<username>\NTUSER.DAT. This registry hive file stores user-specific settings and preferences. When a user logs into their Windows® account, the NTUSER.DAT file is loaded into the registry, providing access to personalized configurations for various applications and system settings.

Within the NTUSER.DAT file, a wide range of information is stored. This information may include, for example, user-specific preferences such as desktop settings, display options, file associations, application settings, and more. A NTUSER.DAT file may also contain information related to the browsing history of the user, recently accessed files, and customized settings for specific software installed on the system.

As such, modifications made to the NTUSER.DAT file directly impact the user experience on the system. For example, changing desktop settings, modifying application preferences, or adjusting system configurations, will be reflected when the user logs in. Additionally, if the NTUSER.DAT file becomes corrupted or inaccessible, it can lead to issues such as the loss of personalized settings, application errors, or even difficulties logging into the user account.

A data protection process according to one embodiment may store the registry files for later comparison. In one embodiment, the registry files may be stored alongside the backup or in some location for reference. The registry files may be stored in their native format or enumerated resulting in a normalized format for future comparison.

Figure 2:
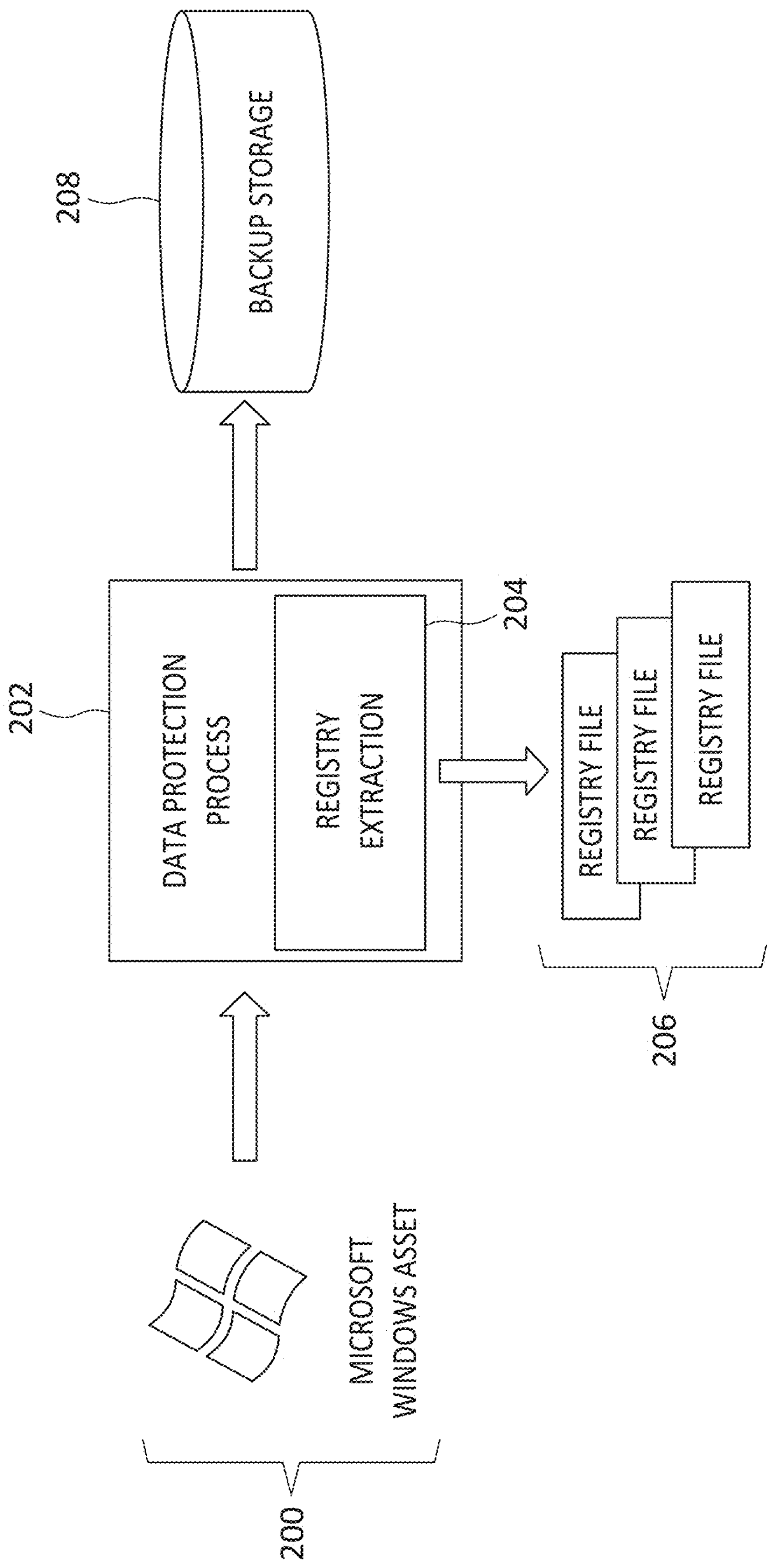
FIG. 2 discloses aspects of a data protection process for registry files.

As shown in the example of FIG. 2, an OS asset 200, such a Microsoft Windows® asset for example, may comprise various registry files. As part of a data protection process 202, a registry extraction process 204 may be performed that comprises extracting one, some, or all, of the registry files 206. In addition to the registry extraction process 204, the data protection process 202 may comprise creating a backup of the registry files 206, and storing that backup in storage 208.

A.5 Registry Interrogation

Once the registry files, see reference 206 in FIG. 2, have been extracted during the data protection process, see reference 202 in FIG. 2, they are now available for interrogation. Enumerating key-value pairs in a Windows registry file requires knowledge of the internal structure of that registry file.

Figure 3:
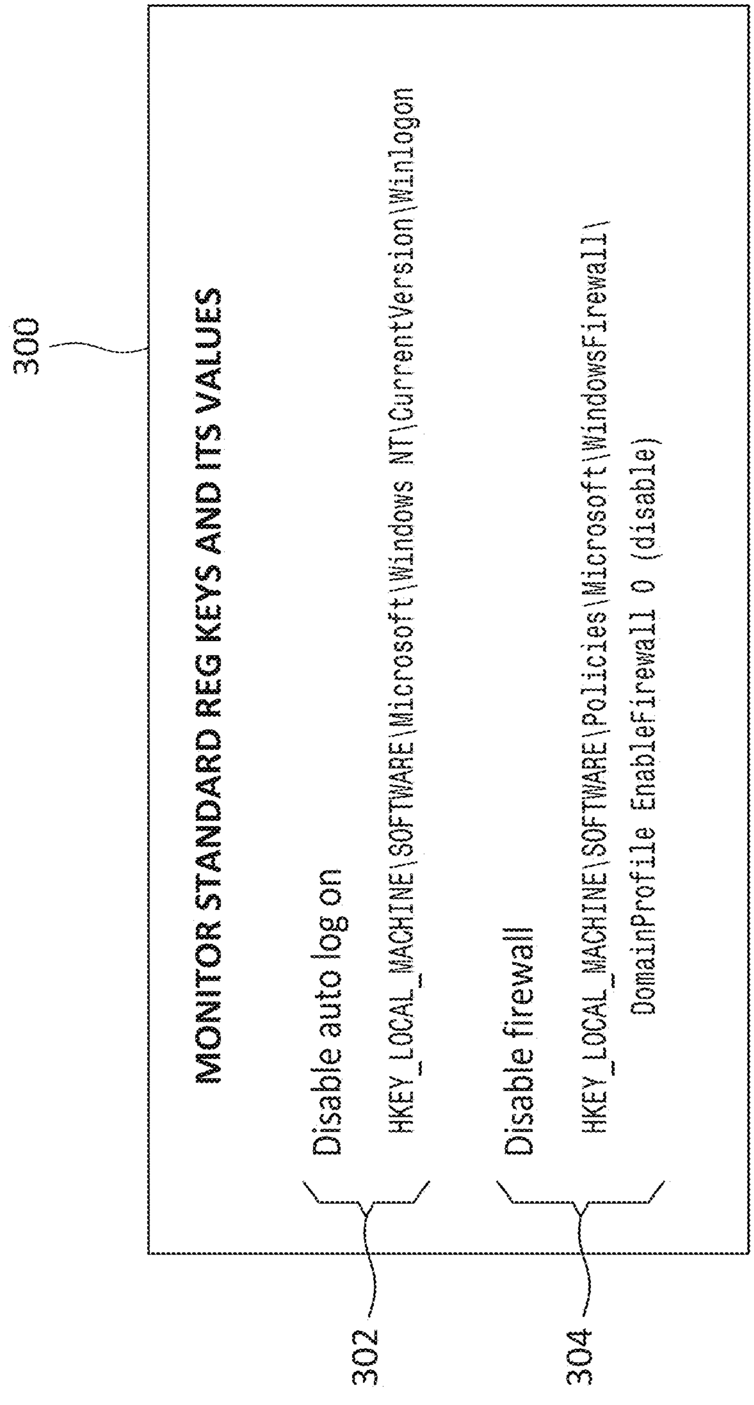
FIG. 3 discloses some example ransomware keys that may be monitored in one embodiment.

In one embodiment, and with reference now to the example of FIG. 3, a first stage 300 of an embodiment comprises examining the extracted registry files for evidence of ransomware, or other malware. As shown in FIG. 3, such examining may comprise monitoring standard registry keys and their respective values. Evidence discovered during such an examining process may include, but is not limited to, operations such as disabling 302 of an auto logon procedure, and disabling 304 of a network firewall, for example. Such evidence may also include identification of a network firewall as having been disabled, and discovery that an auto logon procedure has been disabled.

As well, in the first stage 300 of an embodiment, the extracted registry files may be examined for the addition of known ransomware key-value pairs. In one embodiment, the discovery of known ransomware key-value pairs may be based on static detection, rather than ongoing evaluation, of the extracted registry files, but may be fruitful nonetheless.

Figure 4:
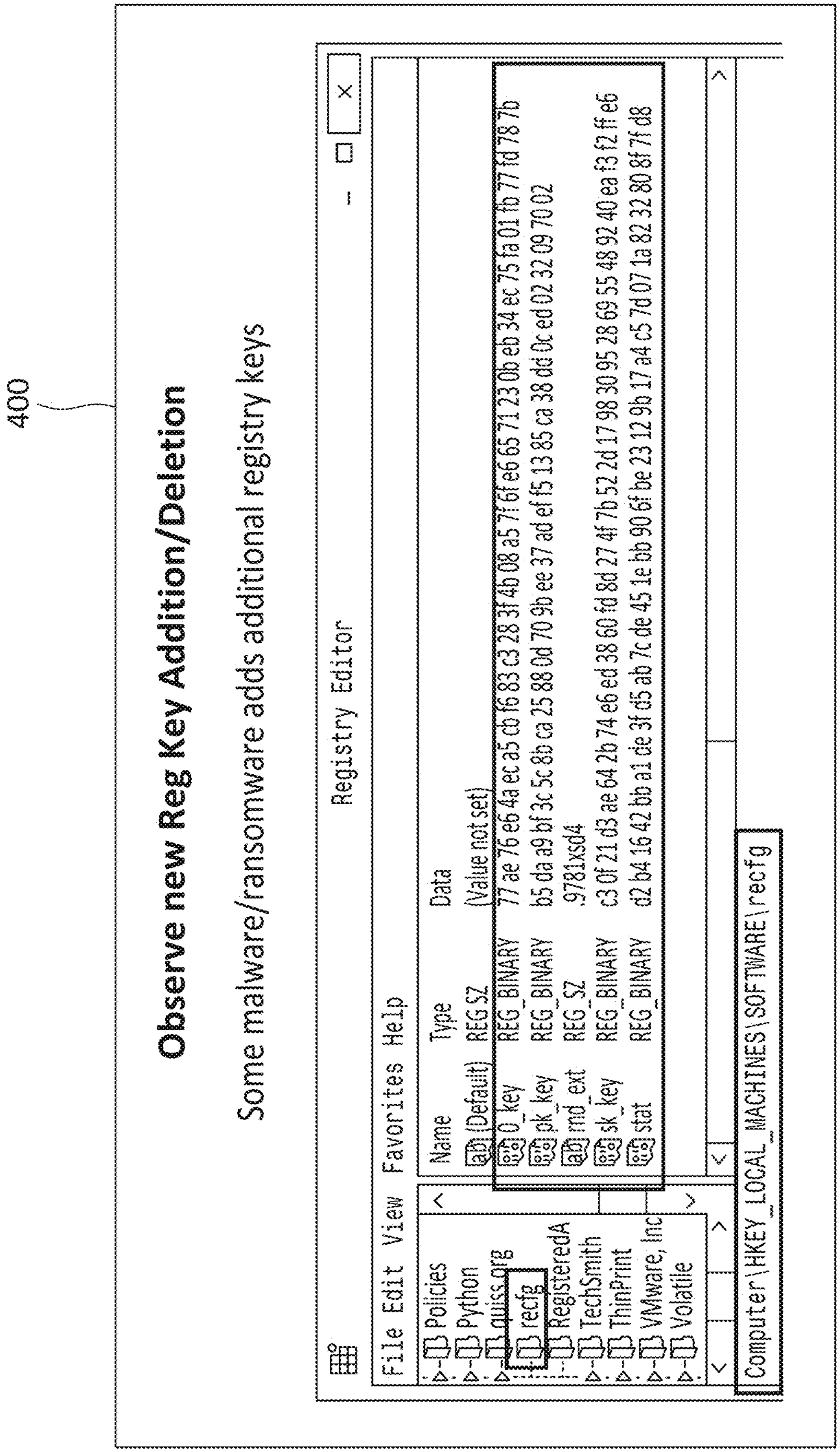
FIG. 4 discloses changes in registry keys that may be detected in one embodiment.

In one embodiment, and with reference now to FIG. 4, a second stage 400 of an embodiment comprises a comparison of registry files. For example, respective registry files from different backups may be compared to each other to determine if, for example, any registry keys have been added, or deleted, since the earlier backup was taken. The addition and/or deletion of registry keys often indicates that ransomware or other malware has infected the registry files.

A.6 Further Discussion

As disclosed herein, one or more embodiments may comprise various useful features and aspects, although no embodiment is required to possess any of such features and aspects. The following examples are illustrative of such features and aspects, but not exhaustive. For example, an embodiment may comprise a combination of various techniques to detect ransomware. These techniques may be performed in series, that is, one technique may be performed before another technique. Such techniques may include, but are not limited to, watching for well-known ransomware file extensions, requests for ransom files, and entropy changes. One particular embodiment may comprise, separately from, or in addition to, any of the aforementioned techniques, the technique of registry interrogation as part of a data protection process and, as such, an embodiment may be able to detect a whole new class of ransomware strains, and thereby add a level protection not addressed in conventional approaches.

That is, an embodiment may embed this detection of malware, by interrogation of registry files, into a typical registry file data protection process, and an embodiment may use the time-series backup sequence to compare registries between two backups. In one embodiment, the registry files in a backup are compared with registry files in the immediately preceding backup, however that is not required. Thus, in another embodiment, the comparison of registry files may be performed between any two backups in a sequence of backups, so long as the registry files are available in both of the backups.

B. EXAMPLE METHODS

It is noted that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Figure 5:
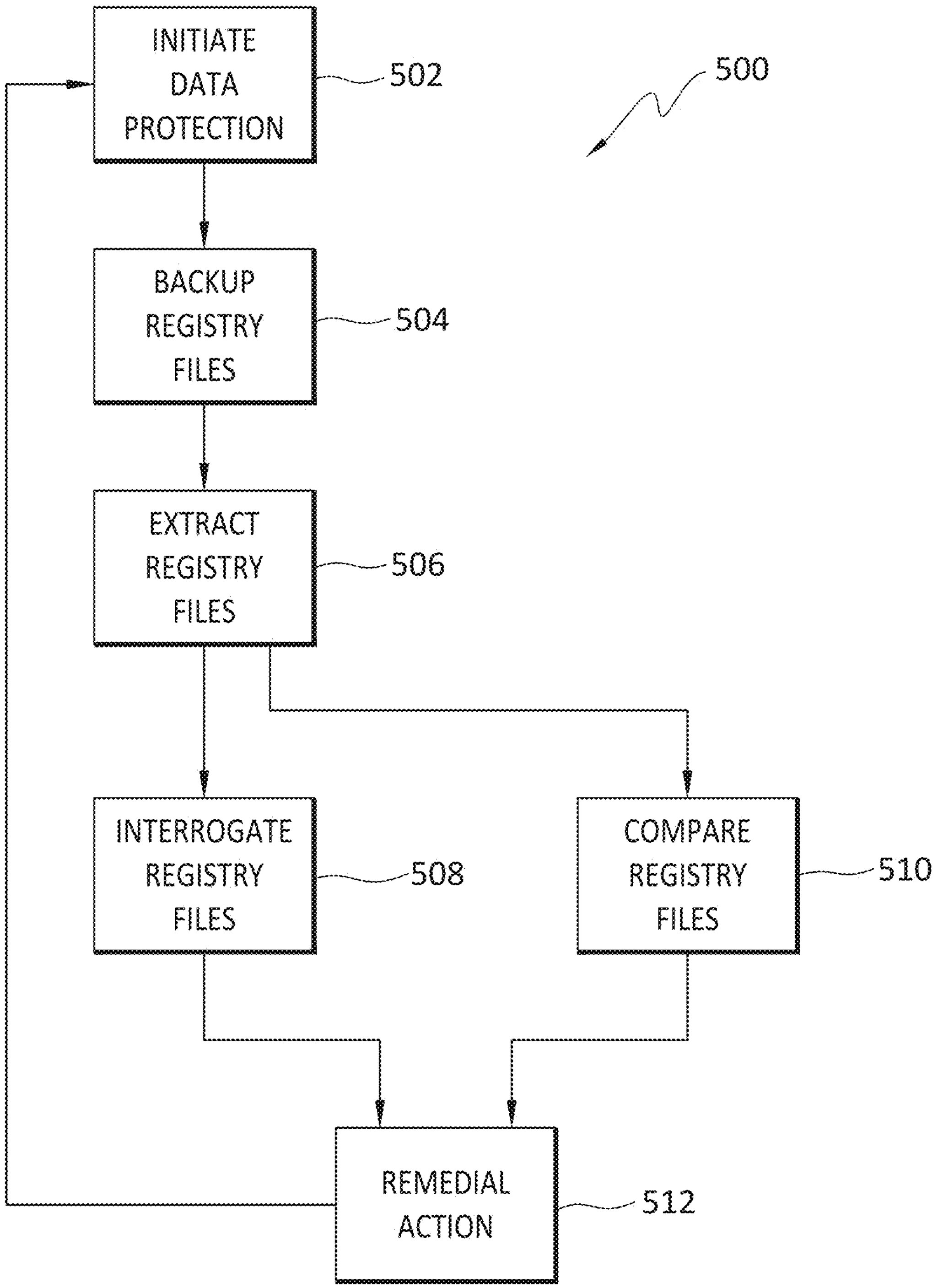
FIG. 5 discloses an example method according to one embodiment.

Directing attention now to FIG. 5, a method 500 according to one embodiment is disclosed. The example method 500 may begin with initiation 502 of a data protection process. The data protection process may be performed ad hoc, or on a scheduled basis. In one embodiment, a data protection process may be initiated 502 in response to detection of a problem or abnormal condition in a system or device.

As part of the data protection process, a backup may be created 504 of the registry files of a system or device. The backup may be stored in a database or other suitable location. As well, the data protection process may also comprise extraction 506 of the registry files of the system or device. It is noted that creation of the backup 504 and the extraction 506 may be performed at the same time, or the extraction 506 may be performed before/after the creation of the backup 504.

After creation of the backup 504, and extraction of the registry files 506, the extracted registry files may be subjected to further processing. For example, the registry files may be interrogated 508 to attempt to identify evidence of malware, such as ransomware, in the registry files. As well, a comparison 510 may be performed of two backups of the registry files. The comparison 510 may serve to identify any registry key additions/deletions/modifications that have taken place since the time the earlier of the two backups was taken. In one embodiment, any differences between the registry key listings of the two backups may be included in a report that may be sent to a user.

Finally, and depending on the outcome of one or both of the interrogation 508 and the comparison 510, one or more remedial actions 512 may be taken. For example, a backup known to be infected may be deleted, or placed in a sandbox, and the system from which the problematic registry files were extracted 506 may be rolled back to the most recent uninfected backup. As another example, security controls may be put in place, or strengthened, in the system from which the registry files were extracted 506. More generally, any remedial action 512 that may reduce, or eliminate, the vulnerability of a system to the identified malware, may be implemented.

C. FURTHER EXAMPLE EMBODIMENTS

Following are some further example embodiments. These are presented only by way of example and are not intended to limit the scope of this disclosure or the claims in any way.

Embodiment 1. A method, comprising: creating a backup of registry files of a system registry; extracting the registry files from the system registry; interrogating the extracted registry files to determine if malware is present in the registry files; comparing the backup with another backup of the registry files to determine if malware is present in the backup; and when malware is determined, by the interrogating and/or the comparing, to be indicated, performing a remedial action to attenuate an impact of the malware.

Embodiment 2. The method as recited in claim 1, wherein the creating of the backup, the extracting, the interrogating, and the comparing, are performed as part of a data protection process for the registry files.

Embodiment 3. The method as recited in claim 1, wherein the malware comprises ransomware.

Embodiment 4. The method as recited in claim 1, wherein the extracted registry files are stored together with the backup.

Embodiment 5. The method as recited in claim 1, wherein comparing the backup comprises looking, in the another backup, to determine if any registry keys have been modified, added to, and/or deleted from, the system registry, the backup was taken.

Embodiment 6. The method as recited in claim 1, wherein interrogating the registry files comprises looking in the registry files for evidence that a ransomware operation has been performed in the system registry.

Embodiment 7. The method as recited in claim 1, wherein the backup and the another backup are any two backups that both contain the registry files.

Embodiment 8. The method as recited in claim 1, wherein the interrogating comprises looking for known ransomware key-value pairs.

Embodiment 9. The method as recited in claim 1, wherein a list of registry file differences is generated after the comparing is performed.

Embodiment 10. The method as recited in claim 1, wherein the registry files include a registry hive file.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

D. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 6:
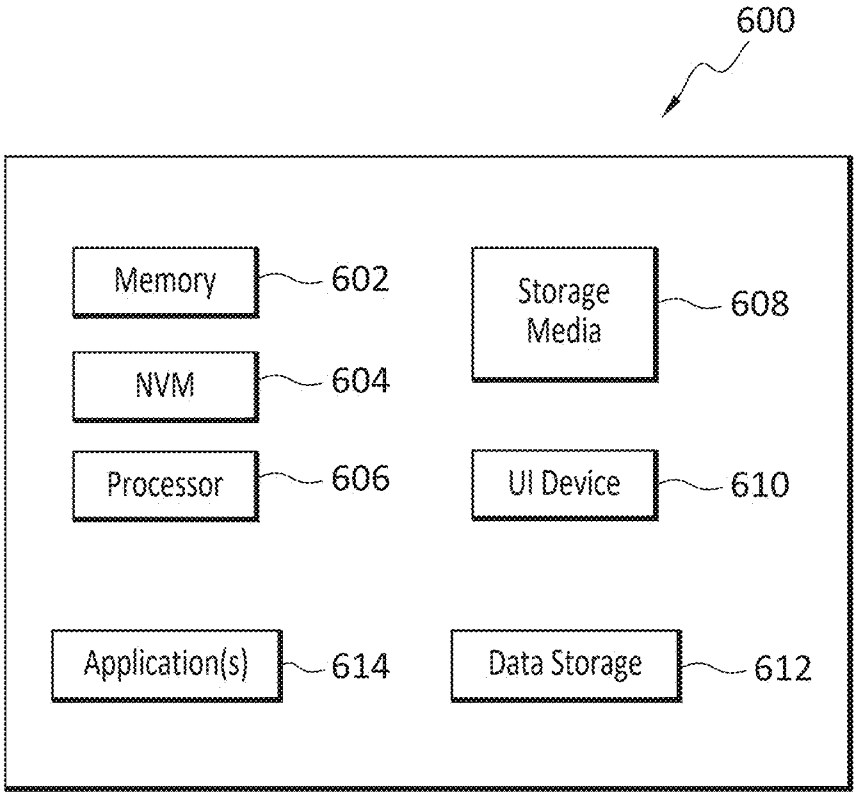
FIG. 6 discloses a computing entity configured and operable to perform any of the disclosed methods, processes, and operations.

With reference briefly now to FIG. 6, any one or more of the entities disclosed, or implied, by FIGS. 1-5, and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. All changes which come within the meaning and range of equivalency of the claims are to be embraced within their scope.

What is claimed is:

1. A method, comprising:

storing registry files of an operating system;

creating, at a first time, a first backup of the registry files;

creating, at a second time that is different than the first time, a second backup of the registry files;

causing the registry files to be stored in a non-native format, which includes an enumerated, normalized format comprising an enumeration of registry key-value pairs extracted from the registry files, wherein the enumerated, normalized format enables comparison of registry keys across multiple backups, including the first backup and the second backup;

interrogating the extracted, non-natively formatted registry files by analyzing the enumeration of the registry key-value pairs to determine if malware is present in the registry files, wherein said interrogating constitutes a first malware detection process, and wherein the interrogating comprises looking for known ransomware key-value pairs;

comparing the first backup of the registry files with the second backup of the registry files to determine if malware is present in at least one of the first backup or the second backup, wherein said comparing constitutes a second malware detection process; and when malware is detected by either or both of the first malware detection process or the second malware detection process, performing a remedial action to attenuate an impact of the malware.

2. The method as recited in claim 1, wherein creating the first and second backups, the extracting, the interrogating, and the comparing, are performed as part of a data protection process for the registry files.

3. The method as recited in claim 1, wherein the malware comprises ransomware.

4. The method as recited in claim 1, wherein the extracted registry files are stored together with the first and second backups.

5. The method as recited in claim 1, wherein comparing the first backup against the second backup comprises looking, in the second backup, to determine if any registry keys have been modified.

6. The method as recited in claim 1, wherein interrogating the registry files comprises looking in the registry files for evidence that a ransomware operation has been performed in the system registry.

7. The method as recited in claim 1, wherein the first backup and the second backup are any two backups that both contain the registry files.

8. The method as recited in claim 1, wherein a list of registry file differences is generated after the comparing is performed.

9. The method as recited in claim 1, wherein the registry files include a registry hive file.

10. A non-transitory storage medium having stored therein instructions that are executable by one or more hardware processors to perform operations comprising:

storing registry files of an operating system;

creating, at a first time, a first backup of the registry files;

creating, at a second time that is different than the first time, a second backup of the registry files;

causing the registry files to be stored in a non-native format, which includes an enumerated, normalized format comprising an enumeration of registry key-value pairs extracted from the registry files, wherein the enumerated, normalized format enables comparison of registry keys across multiple backups, including the first backup and the second backup;

interrogating the extracted, non-natively formatted registry files by analyzing the enumeration of the registry key-value pairs to determine if malware is present in the registry files, wherein said interrogating constitutes a first malware detection process, and wherein the interrogating comprises looking for known ransomware key-value pairs;

comparing the first backup of the registry files with the second backup of the registry files to determine if malware is present in at least one of the first backup or the second backup, wherein said comparing constitutes a second malware detection process; and when malware is detected by either or both of the first malware detection process or the second malware detection process, performing a remedial action to attenuate an impact of the malware.

11. The non-transitory storage medium as recited in claim 10, wherein creating the first and second backups, the extracting, the interrogating, and the comparing, are performed as part of a data protection process for the registry files.

12. The non-transitory storage medium as recited in claim 10, wherein the malware comprises ransomware.

13. The non-transitory storage medium as recited in claim 10, wherein the extracted registry files are stored together with the first and second backups.

14. The non-transitory storage medium as recited in claim 10, wherein comparing the first backup against the second backup comprises looking, in the second backup, to determine if any registry keys have been modified.

15. The non-transitory storage medium as recited in claim 10, wherein interrogating the registry files comprises looking in the registry files for evidence that a ransomware operation has been performed in the system registry.

16. The non-transitory storage medium as recited in claim 10, wherein the first backup and the second backup are any two backups that both contain the registry files.

17. The non-transitory storage medium as recited in claim 10, wherein a list of registry file differences is generated after the comparing is performed.

18. The non-transitory storage medium as recited in claim 10, wherein the registry files include a registry hive file.

* * * * *